US009604864B2

(12) United States Patent
Berros et al.

(10) Patent No.: US 9,604,864 B2
(45) Date of Patent: Mar. 28, 2017

(54) STEAM GENERATION METHOD AND METHOD FOR RECOVERING CRUDE OIL BY STEAM-ASSISTED GRAVITY DRAINAGE (SAGD) INCLUDING SAID STEAM GENERATION METHOD

(71) Applicants: INGENICA INGENIERIE INDUSTRIELLE, Guyancourt (FR); Brais Malouin and Associates Inc., St-Laurent, Quebec (CA)

(72) Inventors: Jeremy Berros, Le Tremblay sur Mauldre (FR); Peter Tye, Beaconsfield (CA)

(73) Assignees: INGENICA INGENIERIE INDUSTRIELLE, Guyancourt (FR); BRAIS MALOUIN AND ASSOCIATES INC., St-Laurent (CA)

( * ) Notice: Subject to any disclaimer, the term of this patent is extended or adjusted under 35 U.S.C. 154(b) by 437 days.

(21) Appl. No.: 14/205,713

(22) Filed: Mar. 12, 2014

(65) Prior Publication Data

US 2014/0262258 A1    Sep. 18, 2014

(30) Foreign Application Priority Data

Mar. 12, 2013  (FR) ...................................... 13 52206

(51) Int. Cl.
*B01D 1/28*  (2006.01)
*B01D 3/06*  (2006.01)
(Continued)

(52) U.S. Cl.
CPC ................. *C02F 9/00* (2013.01); *B01D 1/28* (2013.01); *B01D 3/06* (2013.01); *B01D 19/0036* (2013.01);
(Continued)

(58) Field of Classification Search
CPC .. B01D 1/0041; B01D 1/0047; B01D 1/0064; B01D 1/26; B01D 1/28;
(Continued)

(56) References Cited

U.S. PATENT DOCUMENTS

| 3,298,359 A | 1/1967 | West |
| 3,353,593 A | 11/1967 | Boberg |

(Continued)

FOREIGN PATENT DOCUMENTS

| EP | 1 116 862 | 7/2001 |
| FR | 1 480 893 | 5/1967 |

(Continued)

OTHER PUBLICATIONS

French Search Report dated Nov. 8, 2013, corresponding to the Foreign Priority Application No. 1352206.

*Primary Examiner* — Joseph Drodge
(74) *Attorney, Agent, or Firm* — Young & Thompson

(57) ABSTRACT

The method include (a) compressing the feed water at a low pressure; (b) filtering the feed water; (c) compressing the filtered water stream at a medium pressure; (d) supplying the filtered water stream, compressed at a medium pressure, in the liquid phase of an instant expansion tank; (e) in the tank, heating the stream of step (d) by mixing with the recycled stream (h); (f) compressing again at a high pressure the liquid fraction in the tank and supplying it to the heat exchanger inlet; (g) heating the liquid fraction in the exchanger while maintaining the liquid fraction in the liquid state; (h) recycling the fraction from the step (g) in the tank; and (i) expanding the stream of the step (h) in the expansion tank, generating by instant expansion the searched steam; and (j) separating the solid particles formed as a second blowdown containing water and the particles.

18 Claims, 1 Drawing Sheet

(51) Int. Cl.
*B01D 37/00* (2006.01)
*B01D 36/00* (2006.01)
*C02F 1/04* (2006.01)
*C02F 1/06* (2006.01)
*C02F 1/20* (2006.01)
*C02F 1/52* (2006.01)
*E21B 21/06* (2006.01)
*E21B 43/24* (2006.01)
*F22B 3/04* (2006.01)
*C02F 9/00* (2006.01)
*F22B 37/48* (2006.01)
*F22B 37/54* (2006.01)
*B01D 19/00* (2006.01)
*C02F 1/00* (2006.01)
*C02F 101/32* (2006.01)

(52) U.S. Cl.
CPC ............ *E21B 43/2406* (2013.01); *F22B 3/04* (2013.01); *F22B 37/486* (2013.01); *F22B 37/54* (2013.01); *C02F 1/004* (2013.01); *C02F 1/048* (2013.01); *C02F 1/06* (2013.01); *C02F 1/20* (2013.01); *C02F 2101/32* (2013.01); *C02F 2301/046* (2013.01)

(58) Field of Classification Search
CPC .. B01D 1/2881; B01D 1/2884; B01D 1/2805; B01D 1/2856; B01D 1/30; B01D 1/00; B01D 1/2803; B01D 3/00; B01D 3/06; B01D 3/007; B01D 17/00; B01D 19/00; B01D 19/0031; B01D 19/0036; B01D 21/00; B01D 21/009; B01D 36/00; B01D 36/001; B01D 36/03; B01D 37/00; C02F 1/041; C02F 1/042; C02F 1/043; C02F 1/045; C02F 1/00; C02F 1/004; C02F 1/02; C02F 1/04; C02F 1/048; C02F 1/06; C02F 1/20; C02F 1/28; C02F 1/52; C02F 1/5209; C02F 9/00; C02F 2301/046; C02F 2303/10; C02F 2103/365; C02F 2101/32; E21B 21/06; E21B 21/063; E21B 21/065; E21B 21/067; E21B 43/16; E21B 43/24; E21B 43/2406; E21B 43/2408; E21B 43/34; E21B 43/40; F28D 21/00; F28D 21/0001; F28D 2021/0059; F22B 3/00; F22B 3/04; F22B 3/045; F22B 3/06; F22B 37/00; F22B 37/48; F22B 37/486; F22B 37/54; F22B 37/56; F22B 37/565
USPC ..... 60/39.19, 39.55, 39.53, 39.54, 645, 683, 60/773, 783, 670; 95/97, 241, 243, 251, 95/254, 259; 159/47.1, 47.3; 166/267, 166/272.3; 175/66, 206, 207; 122/6 R, 122/7 R; 202/154, 155, 173, 176, 177, 202/185.1; 203/10, 11, 22, 24, 26, 27, 39, 203/73, 74, 88; 210/702, 712, 737, 750, 210/774, 804, 806, 259, 182, 808
See application file for complete search history.

(56) References Cited

U.S. PATENT DOCUMENTS

| | | | |
|---|---|---|---|
| 6,375,803 | B1 | 4/2002 | Razzaghi et al. |
| 6,536,523 | B1 * | 3/2003 | Kresnyak ............ B01D 1/0047 166/266 |
| 7,438,129 | B2 * | 10/2008 | Heins .................. C02F 1/04 159/24.1 |
| 7,837,768 | B2 * | 11/2010 | Sanderson ............ B01D 1/16 165/108 |
| 2002/0004157 | A1 * | 1/2002 | Keefer et al. ........ B01D 53/047 429/415 |
| 2013/0240442 | A1 * | 9/2013 | Chidambaran ......... C02F 9/00 210/638 |
| 2014/0000273 | A1 * | 1/2014 | Mittricker et al. ....... F02C 3/34 60/773 |
| 2014/0014492 | A1 * | 1/2014 | Younes ................ B01D 3/065 203/11 |
| 2014/0166263 | A1 * | 6/2014 | Slater ................ E21B 43/2406 166/62 |

FOREIGN PATENT DOCUMENTS

| | | |
|---|---|---|
| FR | 1 492 517 | 8/1967 |
| GB | 2337210 | 11/1999 |
| JP | 2009-097790 | 5/2009 |
| WO | 2009/071981 | 6/2009 |
| WO | 2011/102408 | 8/2011 |

* cited by examiner

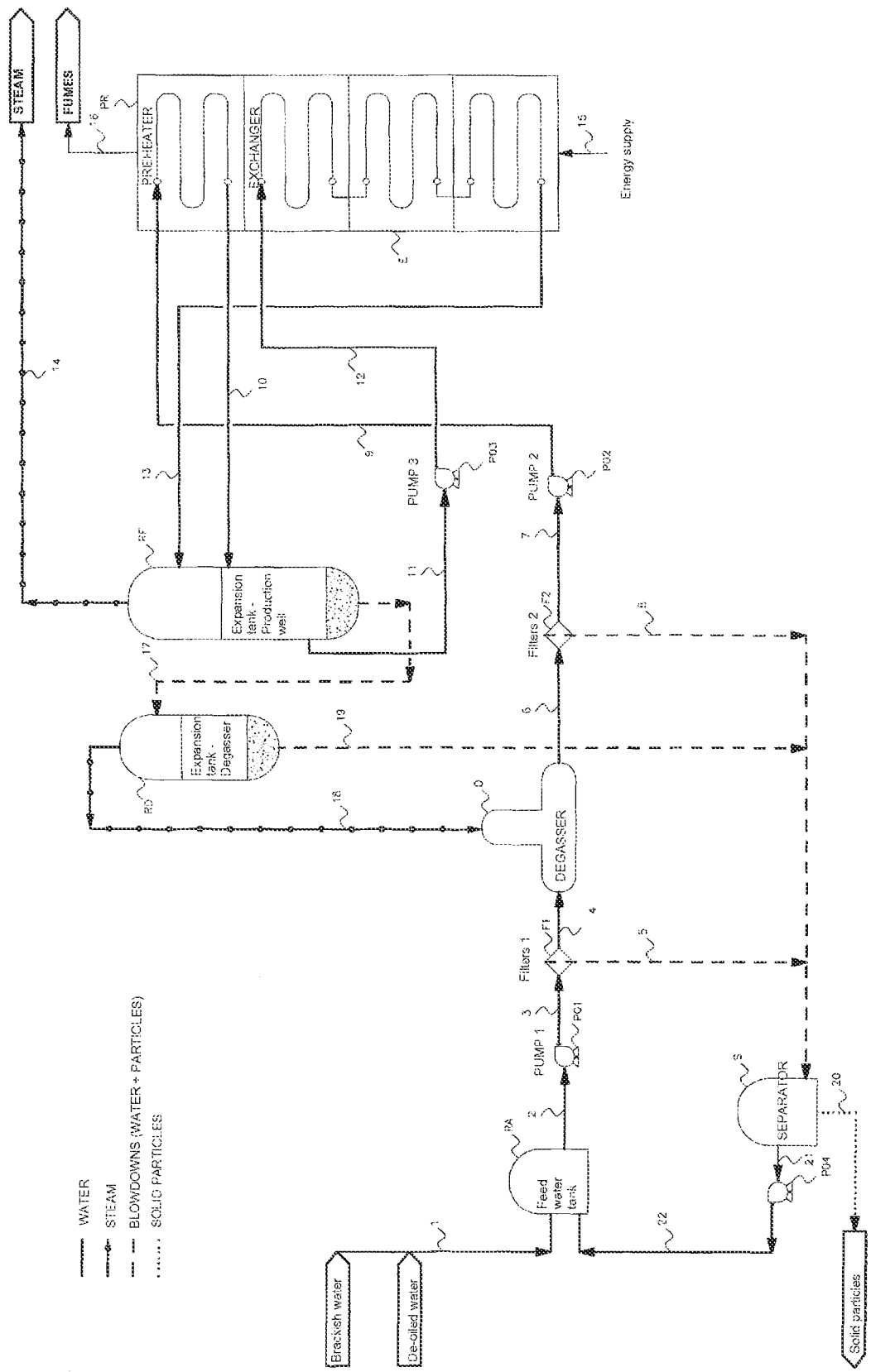

STEAM GENERATION METHOD AND METHOD FOR RECOVERING CRUDE OIL BY STEAM-ASSISTED GRAVITY DRAINAGE (SAGD) INCLUDING SAID STEAM GENERATION METHOD

CROSS REFERENCE TO RELATED APPLICATIONS

Applicant claims priority under 35 U.S.C. 119 of French patent application no. 1352206 filed on Mar. 12, 2013.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The present invention relates to a steam generation method. Especially, in the technological field of assisted recovery of hydrocarbons, the invention relates to a method for generating steam for applications of gravity drainage assisted by steam injection, known as SAGD method (Steam-Assisted Gravity Drainage).

The in-situ exploitation of oil deposits of bituminous sands by the SAGD technique currently uses either natural circulation steam boilers with a separating flask or forced circulation steam generators of the OTSG (Once Through Steam Generators)-type. Both types of steam generators require a feed of high quality water. However, the water recovered in the SAGD method is far from meeting the high quality criteria and has to undergo an expensive treatment.

This treatment consists in numerous filtering, sweetening and ion exchange apparatuses such that the feed water comprises as little particles and minerals as possible.

The main reason which requires a high level of water treatment derives from the fact that the heating of water produces a boiling which concentrates solids and salts dissolved in the liquid phase. When the concentration exceeds a critical threshold, solids are deposited on the exchange surfaces, inhibiting thereby cooling of said surfaces and causing a local overheating of the metal. This overheating possibly causes a metal breaking, which can cause significant shutdown and non-production periods.

The very large amounts of water required for the SAGD method coupled to environmental and governmental constraints require the major part of used water to be recycled. This thereby results in a gradual concentration of dissolved solids into water, which amplifies the above-described deposition problem. Although the OTSG-type steam generators withstand the presence of dissolved solids better than boilers with flask, they can eventually be subjected to the fouling effect.

Currently, the water treatment is estimated to monopolize up to 70% of capital expenditure and 20% of operating costs of a steam generating plant in the SAGD method.

In the known steam generation methods, steam and droplets of water are generated at the boiler outlet. The steam part represents the so-called steam quality. It is low in the known methods, being of the order of 75%.

BRIEF SUMMARY OF THE INVENTION

The present invention aims to solve these drawbacks, the steam generation method which makes its subject-matter allowing to generate steam with a yield close to 100%, without providing reagents or chemicals for purifying the feed water.

The new instant expansion method ("flash") which is contemplated according to the invention allows to generate the steam required by the SAGD method by using as the feed a water having a quality well below the quality required for OTSG units or boilers with flask.

By decoupling heating and phase changing processes, the "flash" process contemplated according to the invention provides a solution to the steam generation problem from a water having a bad quality. First, the heat transfer is performed without boiling in the high pressure water, which high pressure water will then be expanded in an instant expansion tank where the water-steam separation is performed. Inasmuch as the heat flow during the heating remains under the critical limit, no boiling will happen and the heat exchanger will remain free of any deposit. The control of this heat flow is performed by a staged combustion with intermediate cooling which also provides the advantage of significantly reducing the maximum temperatures where $NO_x$ is generated. As a result, a very low $NO_x$ emission, lower than 5 ppm, is obtained.

The present invention relates first to a steam generation method from a feed water containing solid particles in suspension and mineral materials in solution, wherein the method comprises:
(a) compressing said feed water at a low pressure;
(b) filtering said feed water in order to obtain:
  a filtered water stream, cleared from the solid particles contained in feed water; and
  a first blowdown containing water and filtered solid particles;
(c) compressing the filtered water stream at a medium pressure;
(d) directing said filtered water stream, compressed at a medium pressure, in the liquid phase of an instant expansion tank;
(e) in said instant expansion tank, heating said stream from step (d) by mixing with the recycled stream from following step (h);
(f) compressing again at a high pressure the liquid fraction in said instant expansion tank and sending the liquid fraction to the inlet of a heat exchanger or a group of heat exchangers connected in series;
(g) heating the non-expanded liquid fraction in said heat exchanger(s) while maintaining the non-expanded liquid fraction in the liquid state;
(h) recycling the fraction from step (g) in said instant expansion tank; and
(i) in said instant expansion tank, expanding said stream from step (h) and generating by instant expansion the searched steam containing the mineral materials of the feed water which remained in solution; and (j) separating the solid particles formed from:
    the precipitation of the mineral materials in solution under the action of temperature and/or pressure in said instant expansion tank; and
    the decantation associated with the mineral materials derived from the vaporization in said instant expansion tank;
    as a second blowdown containing water and said particles.

During normal operation, steps (e) and (i) are performed simultaneously.

Between step (b) and step (c), the following steps can further be performed:
(k) degassing said filtered water stream with steam supply in order to obtain a water stream, which is filtered, degassed and heated by said supplied steam;
(l) filtering again said water stream from step (k) in order to obtain:
    a water stream, cleared from the solid particles that it contains, where at least a part of the solid particles was formed by precipitating at least part of the mineral materials in solution under the action of temperature rise of the water stream in the degassing step and, possibly, also under the pressure rise of said water stream; and
    a third blowdown formed by water and filtered solid particles;
as well as a step of:
(m) directing the second blowdown from step (j) to a secondary instant expansion tank to obtain:
    the steam supply to the degassing step (k); and
    a fourth blowdown containing water and decanted solid particles in said secondary instant expansion tank.

Preheating of the water stream can further be performed in at least one of the following positions:
    before step (a);
    between step (a) and step (b);
    between step (b) and step (c); and
    between step (c) and heating step (e) by mixing, particularly between step (c) and heating step (e) by mixing.

Preheating of the water stream can further be performed in at least one of the following positions:
    between step (b) and step (k); and
    between step (k) and step (l).

In the case where the feed water comes from an oil recovery method by steam-assisted gravity drainage (SAGD method), the feed water generally comprises brackish water from at least one surrounding water reserve and/or de-oiled water resulting from condensation of steam produced by a SAGD method.

The feed water can be stored within an atmospheric pressure storage tank before sending the feed water to the low pressure compressing step (a).

In step (a), the feed water can be compressed at a low pressure from $3 \times 10^5$ to $4 \times 10^5$ Pa (3 to 4 bars).

In step (b), particles can be filtered up to a size of 1 micron.

In step (c), the filtered water stream can be compressed at a medium pressure from $110 \times 10^5$ to $120 \times 10^5$ Pa (110 to 120 bars).

In step (e), said stream from step (d) can be heated at a temperature from 80 to 300° C. and at a pressure from $70 \times 10^5$ to $100 \times 10^5$ Pa (70 to 100 bars).

In step (f), the non-expanded liquid fraction can be compressed again at a high pressure from $120 \times 10^5$ to $180 \times 10^5$ Pa (120 to 180 bars).

In step (g), the non-expanded liquid fraction can be heated in said heat exchanger(s) at a temperature from 320 to 350° C.

In step (k), degassing can be performed by providing steam at a temperature from 100 to 120° C.

In step (l), particles can be filtered up to a size of 1 micron.

The blowdown or at least a part of the blowdown, except the blowdown part sent to the secondary expansion tank, is sent to a separating step in order to obtain:
    solid particles to be discharged; and
    a water which is recycled to the feed water or to the feed water tank by a recirculation pump.

A preheating step of the water stream can be performed in a preheater between step (c) and heating step (e) by mixing at a temperature from 210 to 280° C.

Energy can be supplied to the exchanger or the exchangers in series and to the preheating between step (c) and step (e) following a same circuit entering the exchanger or the first exchanger of the series and leaving the preheater as fumes.

According to a particular embodiment of the steam generation method of the invention, comprising steps (a) to (m) and a preheating step between steps (c) and (e):
    in step (a), the water is compressed at a pressure from $3 \times 10^5$ to $4 \times 10^5$ Pa (3 to 4 bars);
    the water filtered in step (b) is sent to the degassing step (j) at a pressure from $2 \times 10^5$ to $3 \times 10^5$ Pa (2 to 3 bars);
    the water degassed in step (j) is sent to the filtering step (l) at a temperature from 110 to 120° C.;
    the filtered water from step (l) is sent to the compressing step (c) at a pressure from $10^5$ to $2 \times 10^5$ Pa (1 to 2 bars);
    the water is compressed in step (c) at a pressure from $110 \times 10^5$ to $120 \times 10^5$ Pa (110 to 120 bars);
    the preheated water between steps (c) and (e) is sent, under a pressure from $110 \times 10^5$ to $120 \times 10^5$ Pa (110 to 120 bars), at a temperature from 210 to 280° C. in the liquid phase of the instant expansion tank in which it is heated again by mixing with the recycled water fraction compressed under a high pressure from $70 \times 10^5$ to $100 \times 10^5$ Pa (70 to 100 bars), in step (g) and heated in the heat exchanger or exchangers at a temperature from 320 to 350° C.; and
    the steam generated in the instant expansion step (m) in the secondary instant expansion tank being directed in the degassing step (k) at a temperature from 100 to 120° C. and under a pressure from $3 \times 10^5$ to $4 \times 10^5$ Pa (3 to 4 bars).

The present invention also relates to a steam-assisted gravity drainage method, according to which steam is injected in an upper horizontal well, said steam driving heavy crude oil and bitumen into a lower vertical well, the heavy crude oil and bitumen being collected in said lower well together with the water derived from the condensation of injected steam, wherein the water derived from the condensation of the injected steam is sent as the feed water of the method as above-defined, and wherein the steam obtained by this method is recycled to the said steam-assisted gravity drainage method.

BRIEF DESCRIPTION OF THE SEVERAL VIEWS OF THE DRAWING

The following Example illustrates the invention, without limiting its scope, and corresponds to the embodiment shown on the single FIG. 1 of the appended drawing.

DETAILED DESCRIPTION OF THE INVENTION

In this embodiment, brackish water from, for example, surrounding wells, and de-oiled water from steam used in a SAGD method are first directed by a piping 1 in a feed water tank RA in order to be stored therein and constitute the feed water of the method.

The feed water in the feed water tank RA is a water constituted by well water and water recycled at atmospheric pressure, which is directed by a piping 2 to a pump PO1 (PUMP 1).

The pump PO1 sends the feed water via a piping 3 to a set of filters F1 (FILTERS 1), which separate the feed water into a first filtered water stream at a pressure P1 from 3 to 4 bars, sent by a piping 4 to a degasser D, and a first stream of a first blowdown sent in a piping 5.

In the degasser D, the filtered water stream is degassed in order to reduce the oxygen, $CO_2$ and air content and is also preheated in order to form at the degasser outlet a degassed water stream at a temperature T1 from 110 to 120° C. and a pressure P2 of 2 to 3 bars sent by a piping 6 to a set of filters F2 (FILTERS 2).

The set of filters F2 separates the degassed water stream into solid particles coming from the piping 6 in a filtered water stream, sent by a piping 7 at a pressure P3 from 1 to 2 bars, and a blowdown stream sent in a piping 8.

The filtered water stream is then sent, via a pump PO2 (PUMP 2) which transfers in a piping 9 the filtered water stream, to a preheater PR so as to reach a temperature T2 from 210 to 280° C. and a pressure P4 from 110 to 120 bars, and then this preheated stream is sent via a piping 10 to an expansion tank RF (known as production well expansion tank 2) in the liquid phase contained within this tank.

In the liquid phase of the expansion tank RF, the preheated water stream undergoes a second heating due to the mixing with a recirculated water fraction 13 in order to form at the liquid phase outlet of the expansion tank RF:
  a recirculated water, sent by a piping 11 to a pump PO3 (PUMP 3) which transfers it, at a temperature T3 from 250 to 300° C. and under a pressure P5 of 70 to 100 bars, to a set of heat exchangers mounted in series E by a piping 12;
  a blowdown formed by water and solid particles in the lower part, sent by a piping 17 to a degasser expansion tank RD.

The water transferred by the pump PO3 to the set of heat exchangers mounted in series E is gradually heated in this set E by a supply of heat 15 in order to form, at the outlet of the set E, water heated at a temperature T5 from 320 to 350° C. and under a pressure P8 from 120 to 180 bars inserted via a piping 13 in the gaseous phase of the expansion tank RF to undergo therein an instant vaporization.

In the gaseous phase of the expansion tank RF, the heated water stream 13 is subjected to an instant vaporization in order to form at the outlet of the expansion tank RF:
  pure steam at a pressure P9 from 70 to 100 bars in the upper part, sent by a piping 14 to a production well in order to be used with a SAGD method;
  water to be recirculated and to be sent by the piping 11;
  the blowdown formed by water and solid particles in the lower part, sent by the piping 17 to the expansion tank of the degasser RD.

In the degasser expansion tank RD, the blowdown of the expansion tank RF supplied by the piping 17 undergoes an instant vaporization in order to form, in the upper part, steam used in the degasser D, and sent thereto by a piping 18 between the upper part of the expansion tank of the degasser RD and the degasser D.

A blowdown is formed in the lower part of the degasser expansion tank RD and is sent into a piping 19.

Blowdowns from piping 5, 8, 19 are sent to a separator S where they are separated in order to form, at the outlet of the separator S, on the one hand solid particles 20 which are discarded and on the other hand separated water 21 sent to a pump PO4 (PUMP 4) which transfers it to the feed water tank RA for a recycling 22.

In the set E, the heated water from the piping 13 is gradually heated in order to heat the water at the desired temperature without inducing any boiling during the heating, which could deposit solid particles in the set E.

It can be noted that only one heat exchanger could be used instead of the set E of heat exchangers mounted in series.

On the unique FIG. 1 of the appended drawing, the fume outlet 16 is shown (by 15) at the energy supply circuit outlet, which is the same for the set E of exchangers and the preheater PR.

The invention claimed is:

1. A steam generation method from a feed water containing solid particles in suspension and mineral materials in solution, wherein the method comprises:
  (a) compressing said feed water at a low pressure of $3 \times 10^5$ to $4 \times 10^5$ Pa;
  (b) filtering said feed water in order to obtain:
    a filtered water stream, cleared from the solid particles contained in feed water; and
    a first blowdown containing water and filtered solid particles;
  (c) compressing the filtered water stream at a medium pressure of $110 \times 10^5$ to $120 \times 10^5$ Pa;
  (d) directing said filtered water stream, compressed at said medium pressure, in an instant expansion tank containing a liquid phase, said filtered water stream being directed in the liquid phase of said instant expansion tank;
  (e) in said instant expansion tank, heating said stream from step (d) by mixing with the recycled stream from following step (h);
  (f) compressing again at a high pressure of $120 \times 10^5$ to $180 \times 10^5$ Pa the liquid phase in said instant expansion tank and sending the liquid phase to the inlet of a heat exchanger or a group of heat exchangers connected in series;
  (g) heating the liquid phase in said heat exchanger(s) while maintaining the liquid phase in the liquid state;
  (h) recycling the phase from step (g) in said instant expansion tank; and
  (i) in said instant expansion tank, expanding said phase from step (h) and generating by instant expansion the steam containing mineral materials of the feed water which remained in solution; and
  (j) separating the solid particles formed from:
    a precipitation of the mineral materials in solution under the action of temperature and/or pressure in said instant expansion tank; and
    a decantation associated with the mineral materials derived from the vaporization in said instant expansion tank;
  as a second blowdown containing water and said particles.

2. The method according to claim 1, wherein between step (b) and step (c), the following steps are included:

(k) degassing said filtered water stream with a steam supply in order to obtain a water stream, which is filtered, degassed and heated by said supplied steam;

(l) filtering again said water stream from step (k) in order to obtain:

a water stream, cleared from solid particles; and a third blowdown containing water and filtered solid particles;

(m) directing the second blowdown from step (j) to a secondary instant expansion tank to obtain:

the steam supply to the degassing step (k); and a fourth blowdown containing water and decanted solid particles in said secondary instant expansion tank.

3. The method according to claim 2, wherein preheating of the water stream is further performed in at least one of the following positions:

between step (b) and step (k); and between step (k) and step (l).

4. The method according to claim 2, wherein in step (k), the degassing step is performed by supplying steam at a temperature of 100 to 120° C.

5. The method according to claim 2, wherein in step (l), particles are filtered up to a size of 1 micron.

6. The method according to claim 2, comprising the steps (a) to (m) and a preheating step between steps (c) and (e), wherein:

in step (a), the water is compressed at a pressure of $3 \times 10^5$ to $4 \times 10^5$ Pa;

the water filtered in step (b) is sent to the degassing step (j) at a pressure of $2 \times 10^5$ to $3 \times 10^5$ Pa;

the water degassed in step (j) is sent to the filtering step (l) at a temperature of 110 to 120° C.;

the filtered water from step (l) is sent to the compressing step (c) at a pressure of $10^5$ to $2 \times 10^5$ Pa;

the water is compressed in step (c) at a pressure of $110 \times 10^5$ to $120 \times 10^5$ Pa;

the preheated water between steps (c) and (e) is directed, under a pressure of $110 \times 10^5$ to $120 \times 10^5$ Pa, at a temperature of 210 to 280° C. in the liquid phase of the instant expansion tank in which the preheated water between steps (c) and (e) is heated again by mixing with the recycled water fraction compressed under a high pressure of $70 \times 10^5$ to $100 \times 10^5$ Pa, in step (g) and heated in the heat exchanger or exchangers at a temperature of 320 to 350° C.; and the steam generated in the instant expansion step (m) in the secondary instant expansion tank being directed to the degassing step (k) at a temperature of 100 to 120° C. and under a pressure of $3 \times 10^5$ to $4 \times 10^5$ Pa.

7. The method according to claim 2, wherein the first blowdown from step (a) and/or the third blowdown from step (l) and/or the fourth blowdown from step (m) is/are sent to a separating step in order to obtain:

solid particles to be discharged; and a water which is recycled to the feed water or to the supply water tank by a recirculation pump.

8. The method according to claim 1, wherein a preheating of the water stream is further performed in at least one of the following positions:

before step (a);

between step (a) and step (b);

between step (b) and step (c); and between step (c) and heating step (e) by mixing.

9. The method according to claim 1, wherein said feed water comprises brackish water from at least one surrounding water reserve and/or de-oiled water resulting from condensation of steam produced by a steam assisted gravity drainage (SAGD) method.

10. The method according to claim 1, wherein the feed water sent to step (a) comes from a storage tank at atmospheric pressure.

11. The method according to claim 1, wherein in step (b), particles are filtered up to a size of 1 micron.

12. The method according to claim 1, wherein in step (e), said stream from step (d) is heated at a temperature of 80 to 300° C. and at a pressure of $70 \times 10^5$ to $100 \times 10^5$ Pa.

13. The method according to claim 1, wherein in step (g), the liquid fraction is heated within said heat exchanger(s) at a temperature of 320 to 350° C.

14. The method according to claim 1, wherein at least a part of said first blowdown is sent to a separating step in order to obtain:

solid particles to be discharged; and a water which is recycled to the feed water or to the supply water tank by a recirculation pump.

15. The method according to claim 1, wherein a preheating step of the water stream is performed in a preheater between step (c) and heating step (e) by mixing at a temperature of 210 to 280° C.

16. The method according to claim 15, wherein energy is supplied to the exchanger or exchangers in series used in step (f) and to the preheater used in said preheating step between step (c) and step (e), said energy supply following a same circuit entering said exchanger or the first exchanger of said series and leaving the preheater as fumes.

17. A steam-assisted gravity drainage method, according to which steam is injected in an upper horizontal well, said steam driving heavy crude oil and bitumen into a lower vertical well, the heavy crude oil and bitumen being collected in said lower well together with the water derived from the condensation of injected steam, wherein the water derived from the condensation of the injected steam is the feed water of the method of claim 1, and wherein the steam is recycled to the said steam-assisted gravity drainage method.

18. The method according to claim 15, comprising the steps (a) to (m) and a preheating step between steps (c) and (e), wherein:

in step (a), the water is compressed at a pressure of $3 \times 10^5$ to $4 \times 10^5$ Pa;

the water filtered in step (b) is sent to the degassing step (j) at a pressure of $2 \times 10^5$ to $3 \times 10^5$ Pa;

the water degassed in step (j) is sent to the filtering step (l) at a temperature of 110 to 120° C.;

the filtered water from step (l) is sent to the compressing step (c) at a pressure of $10^5$ to $2 \times 10^5$ Pa;

the water is compressed in step (c) at a pressure of $110 \times 10^5$ to $120 \times 10^5$ Pa;

the preheated water between steps (c) and (e) is directed, under a pressure of $110 \times 10^5$ to $120 \times 10^5$ Pa, at a temperature of 210 to 280° C. in the liquid phase of the instant expansion tank in which the preheated water between steps (c) and (e) is heated again by mixing with the recycled water fraction compressed under a high pressure of $70\times10^5$ to $100\times10^5$ Pa, in step (g) and heated in the heat exchanger or exchangers at a temperature of 320 to 350° C.; and the steam generated in the instant expansion step (m) in the secondary instant expansion tank being directed to the degassing step (k) at a temperature of 100 to 120° C. and under a pressure of $3\times10^5$ to $4\times10^5$ Pa.

* * * * *